(12) United States Patent
Kenny

(10) Patent No.: US 6,221,138 B1
(45) Date of Patent: Apr. 24, 2001

(54) JET INK WITH A MAGNETO-RHEOLOGICAL FLUID

(75) Inventor: Frank J. Kenny, Streamwood, IL (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/343,996

(22) Filed: Jun. 30, 1999

(51) Int. Cl.$^7$ .................................................. C09D 11/00
(52) U.S. Cl. .................................. 106/31.32; 106/31.64; 106/31.33; 106/31.65; 106/31.58; 106/31.86; 252/62.52
(58) Field of Search ...................... 252/62.52; 106/31.32, 106/31.64, 31.58, 31.86, 31.65, 31.33

(56) References Cited

U.S. PATENT DOCUMENTS

| | | | |
|---|---|---|---|
| 2,417,850 | 3/1947 | Winslow | 361/207 |
| 2,661,596 | 12/1953 | Winslow | 60/326 |
| 2,667,237 | 1/1954 | Rabinow | 188/267 |
| 2,670,749 | 3/1954 | Germer | 137/1 |
| 3,010,471 | 11/1961 | Gross | 137/251.1 |
| 3,047,507 | 7/1962 | Winslow | 252/75 |
| 3,465,350 | 9/1969 | Keur et al. | 347/80 |
| 3,465,351 | 9/1969 | Keur et al. | 347/80 |
| 3,663,278 | 5/1972 | Blose et al. | 428/480 |
| 4,026,713 | * 5/1977 | Sambucetti et al. | 106/31.86 |
| 4,405,370 | * 9/1983 | Soga et al. | 252/62.54 |
| 4,508,570 | * 4/1985 | Fujii et al. | 106/31.58 |
| 4,516,140 | 5/1985 | Durkee et al. | 347/71 |
| 4,519,931 | * 5/1985 | Soga et al. | 252/62.51 |
| 4,923,749 | 5/1990 | Talvalkar | 428/341 |
| 4,990,186 | 2/1991 | Jones et al. | 106/31.37 |
| 4,992,190 | 2/1991 | Shtarkman | 252/62.52 |
| 5,244,496 | 9/1993 | Easton et al. | 523/122 |
| 5,300,969 | 4/1994 | Miura et al. | 347/12 |
| 5,463,416 | 10/1995 | Paton et al. | 347/100 |
| 5,505,880 | 4/1996 | Kormann et al. | 252/62.54 |
| 5,510,817 | 4/1996 | Sohn | 347/21 |
| 5,549,837 | 8/1996 | Ginder et al. | 252/62.54 |
| 5,576,747 | 11/1996 | Sohn | 347/48 |
| 5,578,238 | 11/1996 | Weiss et al. | 252/62.52 |
| 5,641,346 | 6/1997 | Mantell et al. | 106/31.58 |
| 5,645,752 | 7/1997 | Weiss et al. | 252/62.54 |
| 5,663,217 | 9/1997 | Kruse | 523/161 |
| 5,672,198 | 9/1997 | Belmont | 106/31.75 |
| 5,711,791 | 1/1998 | Croker et al. | 106/31.35 |
| 5,755,860 | 5/1998 | Zhu | 106/31.15 |
| 5,777,644 | 7/1998 | Yamaguchi et al. | 347/68 |
| 5,829,319 | 11/1998 | Mokeddem | 74/574 |
| 5,858,595 | 1/1999 | Ziolo | 430/106.6 |
| 5,894,000 | 4/1999 | Loy | 252/572 |
| 5,897,695 | 4/1999 | Mayo et al. | 106/31.75 |
| 5,908,495 | 6/1999 | Nohr et al. | 106/31.32 |

FOREIGN PATENT DOCUMENTS

406136014 * 5/1994 (JP) .

OTHER PUBLICATIONS

John P. McTague, "Magnetoviscosity of Magnetic Colloids", *The Journal of Chemical Physics*, vol. 51, No. 1, Jul. 1, 1969, pp. 133–136.

The Coatings Agenda New Products, Sep./Oct. 1998, pp. 1 and 2.

Co–pending Application Ser. No. 08/792,827; filed Jan. 30, 1997, by inventor Joseph D. Roth et al., entitled "UV or Visable Light Initiated Cationic Cured Ink for Ink Jet Printing", assigned to NCR Corporation.

Jul. 1966, International Science and Technology, p. 48.*

* cited by examiner

*Primary Examiner*—Helene Klemanski
*Assistant Examiner*—Veronica F. Faison
(74) *Attorney, Agent, or Firm*—Millen White Zelano & Branigan PC

(57) ABSTRACT

An ink composition suitable for use in ink jet printing comprising a coloring agent and carrier therefor which additionally contains a magneto-rheological fluid to control the viscosity and flow properties of the ink composition during use.

19 Claims, No Drawings

JET INK WITH A MAGNETO-RHEOLOGICAL FLUID

BACKGROUND OF THE INVENTION

The invention relates to ink compositions for ink jet printers which contain a magneto-rheological fluid.

The use of controllable fluids, electro-rheological (ER) and magneto-rheological (MR) fluids, in dampers, was first proposed in the early 1950's by Winslow in U.S. Pat. No. 2,661,596. The use of controllable fluids was generally restricted to the area of clutches, with a few exceptions, until the mid-1980's.

Magneto-rheological fluids (MR fluids) comprise a carrier medium, such as a dielectric medium (mineral oil or silicone oil) and solid particles that are magnetizable so as to respond to a magnetic field. These solid magnetizable particles comprise powders of iron, steel, nickel, cobalt, ferrites and garnets having a particles size large enough to incorporate a multiplicity of magnetic domains. As a result, the particles possess little or no permanent magnetic moment but are readily magnetized by an applied magnetic field. When an external magnetic field is applied to an initially random arrangement of magnetizable particles, a magnetic moment (roughly) parallel to the applied field is induced in each particle. The force between two particles whose moments are aligned head-to-tail is attractive, promoting the formation of chains of nearly contacting particles aligned along the direction of the field. The magneto-rheological fluid fibrillates and highly elongated structures of particles form parallel to the field, typically within milliseconds. The elongated structures of particles essentially form a solid in that the MR fluid does not flow at low shear stress. At high shear stress, the MR fluid flows like a viscous liquid. The stress at which the chains are disrupted and the particles flow is referred to as the yield stress. The yield stress is a function of the magnitude of the applied magnetic field.

The basis for the magneto-rheological effect can be explained by the interparticle force induced by the applied magnetic field.

Ink jet printing has experienced a significant increase in use in recent years due to reduced equipment cost, color availability and improvements in print speed and print resolution. Conventional ink jet printers operate by employing a plurality of actuator elements to expel droplets of ink through an associated plurality of nozzles. A print head actuator is described in U.S. Pat. No. 4,516,140. Each actuator element is typically located in a chamber filled with ink supplied from a reservoir and each actuator element is associated with a nozzle that defines part of the chamber. On energizing a particular actuator element, a droplet of ink is expelled through the nozzle toward a receiving substrate.

There are two major categories of ink jet printing—"Drop-on-Demand" and "continuous" ink jet printing. For continuous ink jet printing, a conducting ink is supplied under pressure to an ink nozzle and forced out through a small orifice. Prior to passing out of the nozzle, the pressurized ink stream proceeds through a ceramic crystal which is subjected to an electric current. This current causes a piezoelectric vibration equal to the frequency of the AC electric current. This vibration, in turn, generates the ink droplets from the unbroken ink stream. The ink stream breaks up into a continuous series of drops which are equally spaced and of equal size. Surrounding the jet, at a point where the drops separate from the liquid stream in a charge electrode, a voltage is applied between the charge electrode and the drop stream. When the drops break off from the stream, each drop carries a charge proportional to the applied voltage at the instant at which it breaks off. By varying the charge electrode voltages at the same rate as drops are produced it is possible to charge every drop to a predetermined level. The drop stream continues its flight and passes between two deflector plates which are maintained at a constant potential. In the presence of this field, a drop is deflected towards one of the plates by an amount proportional to the charge carried. Drops which are uncharged are undeflected and collected into a gutter to be recycled to the ink nozzle. Those drops which are charged, and hence deflected, impinge on a substrate traveling at a high speed at right angles to the direction of drop deflection. By varying the charge on individual drops, the desired pattern can be printed.

In a typical "Drop-on-Demand" ink jet printing process, a fluid ink is forced under pressure through a very small orifice of a diameter typically about 0.0024 inches in the form of minute droplets by rapid pressure impulses. The rapid pressure impulses are typically generated in the print head by either expansion of a piezoelectric crystal vibrating at a high frequency or volatilization of a propellant within the ink by rapid heating cycles. The piezoelectric crystal expansion causes the ink to pass through the orifice as minute droplets in proportion to the number of crystal vibrations. Thermal jet printers employ a heating element within the print head to volatilize a propellant and form droplets in proportion to the number of on-off cycles for the heating element. The ink is forced out of the nozzle when needed to print a spot on a substrate as part of a desired image. The minute droplets may be energized to achieve an electrical charge and deflected as in the continuous ink jet printing. Conventional ink jet printers are more particularly described in U.S. Pat. No. 3,465,350 and U.S. Pat. No. 3,465,351.

Less common Drop-on-Demand ink jet printing processes control the discharge of ink and the amount thereof from a static or variable pressure through the nozzle by varying the viscosity of the ink using an electro-rheological effect. Unlike the processes of U.S. Pat. No. 5,300,969 where inks for jet printing are heated to reduce their viscosity, these methods increase the viscosity of the ink. These less common drop-on-demand processes require a special configuration for the print head to apply an electric potential to the ink so as to vary its viscosity. Examples of such methods and apparatus are described in U.S. Pat. Nos. 5,576,747; 5,777,644 and 5,510,817. Methods and apparatus which employ an ink with electro-rheological properties to reduce the accelerating potential needed to discharge the ink are described in U.S. Pat. No. 5,576,747 and U.S. 5,510,817. Reducing the accelerating potential is said to facilitate miniaturization and simplification of the print head and reduce deformation of the print head by high temperature and pressure. In U.S. Pat. No. 5,777,644, an ink with electro-rheological properties is said to form channels within a print head to define the path of discharged ink. This technique is said to avoid clogging.

Electro-rheological fluids as described by Winslow in U.S. Pat. Nos. 2,417,850 and 3,047,507 are said to be of a minute particle diameter by Sohn, U.S. Pat. No. 5,576,747. As such, they are distinct from magneto-rheological fluids. Sohn, U.S. Pat. No. 5,549,837, also states that electro-rheological (ER) fluids exhibit lower yield strengths than magneto-rheological fluids and that the yield strength of electro-rheological fluids are sensitive to temperature. The higher yield strengths of magneto-rheological fluid enables these fluids to respond to low voltage/low current drive power supplies, which can be smaller in size.

Magnetic particles and ferrofluids have been incorporated in jet inks to provide MICR compositions (see U.S. Pat. No. 5,858,595). In contrast to MR fluids, ferro fluids consist of colloidal magnetic particles, such as magnetite, dispersed in a continuous carrier phase. The particles found in MR fluids are larger in size, typically greater than 0.1 µm. Unlike MR fluids, ferrofluids do not solidify in an applied field, though they do exhibit field-induced viscosity increases. See J. P. McTague, *J. Chem. Phys.*, 51, 133 (1969).

To operate satisfactorily in the processes and equipment used in ink jet printing, the ink must exhibit low viscosity values, contain no large particulate matter to clog the jet orifice and be sufficiently stable so as not to dry or settle such that the jet orifice does not clog when not in use. The ink must also dry rapidly and bond to the print substrate without smearing. Meeting all of these criteria can be complex where particulates are to be added to the jet ink.

SUMMARY OF THE INVENTION

A general objective of this invention is to provide new printing inks for ink jet printing. A specific objective of this invention is to provide printing inks for ink jet printing which contain a magneto-rheological fluid.

Further objects of the present invention will become apparent from the detailed disclosure and claims herein.

The present invention provides printing inks for ink jet printing which contain at least one magneto-rheological fluid. The jet inks also comprise at least one coloring agent and a carrier for the coloring agent. The one or more magneto-rheological fluids are soluble or emulsifiable in water, alcohol, plasticizer or glycol solvent, so as to be compatible with the carrier for the coloring agent.

DETAILED DESCRIPTION OF THE INVENTION

The jet inks of this invention may generally be comprised of the following components:
  a) a magneto-rheological fluid,
  b) one or more coloring agents selected from pigments and dyes, preferably in an amount of about 10 wt. % of the total ink composition and
  c) a carrier for said coloring agent, preferably selected from water, plasticizers, alcohols and glycols.
  Optional components include:
  d) binders which are soluble or dispersible in the carrier for the coloring agent,
  e) performance additives such as pigment dispersants and defoamers and
  f) propellants such as low boiling solvents other than the carrier for the coloring agent.

The one or more magneto-rheological fluids are soluble or dispersible in the carrier for the coloring agent which is typically water, an alcohol or glycol solvent or a plasticizer.

The amount of magneto-rheological fluid added to the ink jet formulation can vary widely from an amount which provides 0.05 vol. % based on the weight of the total ink formulation up to an amount which renders the ink solid at 25° C. and low shear when an external magnetic field is applied. A viscosity change of at least 20% is desired. The magneto-rheological fluid in said ink composition is preferably used in an amount within the range of 0.05 vol. % to 50 vol. %, preferably 0.1 vol. % to 20 vol. %. Essentially any magneto-rheological fluid with a carrier soluble or emulsifiable in the carrier for the coloring agent at these levels can be used in this invention. Amounts well suited for use in conventional drop-on-demand printers range from a 0.1 to 10 vol. %. Within this range, amounts which provide 1 to 5 vol. %, based on the total ink formulation will function well in conventional equipment. With specialized equipment adapted to take advantage of the rheological properties of the ink, higher amounts are suitable; the particular amount depending on the dimensions of the print head. In the absence of a magnetic field, the ink formulations of the present invention have a viscosity in the range of 1–100 cps at 25° C., preferably less than 5 cps at 25° C. and most preferably from 1 to 25 cps at 2.5° C. An increase in these values of at least 20% when an external magnetic field is applied is desirable.

The magnetically active particle component of the MR fluids used in the jet inks of the present invention can be comprised of essentially any solid which is known to exhibit magneto-rheological activity which does not interfere with the discharge of ink in the ink jet process. Typical particle components useful in the present invention are comprised of, for example, paramagnetic, superparamagnetic or ferromagnetic compounds. Specific examples of particle components useful in the present invention include particles comprised of materials such as iron, iron nitride, iron carbide, carbonyl iron, chromium dioxide, low carbon steel, silicon steel, nickel, cobalt and mixtures thereof. In addition, the particle component can be comprised of any of the known alloys of iron, such as those containing aluminum, silicon, cobalt, nickel, vanadium, molybdenum, chromium, tungsten, manganese and/or copper. The particle component can also be comprised of the iron-cobalt and iron-nickel alloys.

The particle component is typically in the form of a metal powder which can be prepared by the processes well known to those skilled in the art. Typical methods for the preparation of metal powders include the reduction of metal oxides, grinding or attrition, electrolytic deposition, metal carbonyl decomposition, rapid solidification, or smelt processing. Various metal powders that are commercially available include straight iron powders, reduced iron powders, insulated reduced iron powders and cobalt powders. The diameter of the particles utilized herein can range from about 0.1 to ½ of the diameter of the jet orifice of the ink jet printer it is to be used in, preferably less than 500 µm. Where the jet ink is to be used in a conventional bubble-jet printer or one using a vibrating piezoelectric crystal, a size in the range of 1–5 µm is preferred. To ensure that the printer selected will not clog, it is preferable to filter the magneto-rheological fluid or the completed ink formulation before use. For specialized printers adapted to exploit the rheological properties of ink jet inks such as those described in U.S. Pat. Nos. 5,777,644; 5,576,747 and 5,510,817, it is preferable to provide a jet orifice which will accommodate particles of a size in the range of 5 to 100 µm. The most preferred sizes within this range such as 10 µm, 20 µm, 30 µm, 40 µm, 50 µm, etc. will depend on the equipment configuration. Preferred particles include powered magnetite and carbonyl iron powders such as the insulated reduced carbonyl iron powders available from GAF Corporation and Sigma Chemical Co. This material can be filtered to remove larger particles when desired.

The particle component preferably comprises from about 5 to 50, most preferably about 15 to 40, percent by volume of the magneto-rheological fluid, depending on the desired magnetic activity and viscosity of the overall material.

The carrier fluid of the magneto-rheological material of the present invention can be any water based, water soluble or water emulsifiable carrier fluid or vehicle conventionally used in magneto-rheological materials. Carrier fluids comprised of water, water soluble organic solvents, or water combined with water soluble organic solvents such as glycols and alcohols are particularly suitable. Plasticizers as used in the carriers for the sensible material can also be added to the carrier. Carrier fluids consisting essentially of water as the liquid component are preferred.

The carrier fluid of the magneto-rheological material used in the present invention should have a viscosity at 25° C. that is between about 2 and 1000 centipoise, preferably between about 3 and 200 centipoise, with a viscosity between about 5 and 100 centipoise being especially preferred. The carrier fluid of the present invention is preferably utilized in an amount ranging from about 50 to 95, preferably from about 60 to 85 percent by volume of the total magneto-rheological material.

Particle settling may be minimized in the magneto-rheological materials of the present invention by forming a thixotropic network. A thixotropic network is defined as a suspension of particles that, at low shear rates, form a loose network or structure sometimes referred to as clusters or flocculates. The presence of this three-dimensional structure impacts a small degree of rigidity to the magneto-rheological material, thereby reducing particle settling. However, when a shearing force is applied through mild agitation, this structure is easily disrupted or dispersed. When the shearing force is removed, this loose network is reformed over a period of time. A thixotropic network may be formed in the magneto-rheological fluid used in the present invention through the utilization of any known hydrogen-bonding thixotropic agents and/or colloidal additives. The thixotropic agents and colloidal additives, if utilized, are typically employed in an amount ranging from about 0.1 to 5.0, preferably from about 0.5 to 3.0 percent by volume relative to the overall volume of the magneto-rheological fluid.

Examples of hydrogen-bonding thixotropic agents useful for forming a thixotropic network in the present invention include low molecular weight hydrogen-bonding molecules, containing hydroxyl, carboxyl or amine functionality, as well as medium molecular weight hydrogen-bonding molecules, such as silicone oligomers, organosilicone oligomers and organic oligomers. Typical low molecular weight hydrogen-bonding molecules other than water include alcohols; glycols; alkyl amines, amino alcohols, amino esters and mixtures thereof. Typical medium molecular weight hydrogen-bonding molecules include oligomers containing sulphonated, amino, hydroxyl, cyano, halogenated, ester, carboxylic acid, ether, and ketone moieties, as well as mixtures thereof.

Examples of colloidal additives useful for forming a thixotropic network in MR fluids employed in the present invention include hydrophobic and hydrophilic metal oxide and high molecular weight powders. Examples of hydrophobic powders include surface-treated hydrophobic fumed silica and organoclays. Examples of hydrophilic metal oxide or polymeric materials include silica gel, fumed silica, clays and high molecular weight derivatives of caster oil, poly(ethylene oxide) and poly(ethylene glycol).

Suitable MR fluids for use in the jet inks of the present invention include those which are conventional, such as those described in U.S. Pat. Nos. 2,667,237; 2,670,749; 3,010,471; 4,992,190; 5,578,238; 5,829,319; 5,645,752 and 5,505,880.

The ink formulations of the present invention contain a coloring agent which is capable of being sensed visually, by optical means, by magnetic means, by electro conductive means or by photoelectric means. Suitable coloring agents are those used in conventional ink jet formulations. These conventional coloring agents are organic or inorganic dyes and pigments. Examples include acidic dyes, basic dyes, food dyes, phthalocyanine dyes, carbon blacks, fluorescent naphthalimide dyes and others such as cadmium, primrose, chrome yellow, ultra marine blue, iron oxide, zinc oxide, titanium oxide, cobalt oxide, nickel oxide, etc. Other examples of conventional coloring agents include those described in U.S. Pat. No. 3,663,278 and U.S. 4,923,749. Reactive dyes such as leuco dyes and diazonium compounds are also suitable. The total amount of coloring agent used conforms to conventional jet ink formulations, which is typically from about 0.01–10 wt. % of the total ink formulation. Where pigments are used such as carbon black, the particles are typically of a size less than 5 $\mu$m.

Water and low molecular weight (low viscosity, low boiling) alcohols and glycols can be used as carriers for the coloring agents. The low boiling alcohols will also function as a propellant where the ink is used in thermal jet printing.

Suitable examples of alcohols include monovalent alcohols such as methyl alcohol, ethyl alcohol, n-propyl alcohol, isopropyl alcohol, n-butyl alcohol, sec-butyl alcohol, tert-butyl alcohol, isobutyl alcohol, n-amyl alcohol, hexyl alcohol, heptyl alcohol, octyl alcohol, mixtures thereof and the like.

Suitable examples of glycols include ethylene glycol, polyether polyols, diethylene glycol, triethylene glycol, 1,2-propylene glycol, dipropylene glycol, 1,3-butanediol, 1,4-butanediol, neopentyl glycol, trimethylol propane, 1,6-hexanediol, pentaerythritol, trimethylol propane, tetramethylolpropane, dipentaerythritol mixtures thereof and the like.

Solvents which may be mixed with the alcohols or glycols are ketones, aldehydes, ethers, esters, hydrocarbons, glycol ethers and lactones.

Suitable hydrocarbons include hexane, heptane, octane, decane, cyclopentane, cyclohexane, benzene, toluol, xylol, ethylbenzene mixtures thereof and the like.

Suitable hydrocarbon halides include carbon tetrachloride, ethylene dichloride, trichloroethylene, tetrachloroethane, dichlorobenzene mixtures thereof and the like.

Suitable ether type solvents include butyl ether, ethylene glycol-diethylether, ethylene glycol-monoethyl ether, ethylene glycol-monobutylether mixtures thereof and the like.

Suitable ketones include acetone, methyl ethyl ketone, methyl propyl ketone, methyl isobutyl ketone, methyl amyl ketone, cyclohexanone mixtures thereof and the like.

Suitable esters include ethyl formate, methyl acetate, propyl acetate, butyl acetate, phenyl acetate, ethylene glycol-monoethyl ether acetate, methylpropionate mixtures thereof and the like.

Plasticizers such as those described in U.S. Pat. No. 3,663,278, may also be used as carriers to aid flexibility of the image formed and/or reduce the viscosity of the ink. Suitable plasticizers include adipic acid esters, phthalic acid esters and ricinoleate acid esters, citrates, epoxides, glycerols, hydrocarbons, chlorinated hydrocarbons, phosphates and the like.

The amount of carrier can range from 10 to 95 vol. % of the total ink formulation. Amounts at the high end of this range are used where the carrier functions as a propellant in thermal jet printers and/or will evaporate on the substrate. The carrier preferably comprises about 75 vol. % of the total ink formulation where the carrier functions as a propellant and evaporates on the substrate.

The ink formulations of the present invention may optionally contain one or more binders. Binders which are suitable include those which are soluble or dispersible in the carrier (plasticizers, water, alcohols or glycols) for the coloring agent. This includes those binders used in conventional jet printing inks such as acrylic polymers as described in U.S. Pat. No. 5,244,496 and polyethylene oxide polymers. Suitable binders also include sugar and alcohol binders (U.S. Pat. No. 5,711,791), cellulosic polymers (U.S. Pat. No. 5,755,860), those described in U.S. Pat. Nos. 5,672,198; 5,663,217 and 4,990,186 and the reactive binders disclosed in U.S. Pat. No. 5,641,346 and copending application Ser. No. 08/792,827, filed Jan. 30, 1997, assigned to the same assignee herein and entitled "UV or Visable Light Initiated Cationic Cured Ink for Ink Jet Printing".

Where used, the ink formulations of the present invention typically comprise from 0.5 to 15 wt. % optional binder, based on the total composition. Preferred amounts range from 1–10 wt. % optional binder, based on the total composition. Preferred levels of optional binder will depend on the polymer(s) used and their viscosity.

The ink formulations of the present invention may optionally contain one or more additives to improve certain properties as jet printing inks. Suitable additives are those used in conventional jet ink formulations which include dispersing agents to help solubilize the pigment or dye, stabilizers, surfactants, pH buffers, fillers, flow adjusters, defoaming agents, leveling agents and/or cobwebbing preventative agents.

Illustrative examples of flow adjusters are low molecular weight organopolysiloxanes such as methylpolysiloxanes which may be used in an amount of 0.01–10 wt. % based on weight of the total ink formulation.

An illustrative example of a defoamer is Anti-Musal JIC, which may be used in an amount of 0.01–10 wt. % based on the weight of the total ink formulation. Illustrative examples of leveling agents are low molecular weight polysiloxane/polyether copolymers and modified organic polysiloxanes, which may be used in an amount of 0.01–10 wt. % based on the weight of the total ink formulation.

Other suitable additives used in conventional jet ink formulations are those which reduce bacterial growth (Towisyl 75), which provide wettability (butylcarbitol), which prevent the composition from drying out within the print head (humectants: polyethylene glycols), which enhance the conductivity of the ink formulation for use in continuous ink jet printers and which prevent polymerization of inks by natural or ambient light (photostabilizers). Other suitable additives used in conventional jet ink formulations include weatherability improvers (UV light absorbers), flexibilizers (oil) and fillers.

Where the ink composition is to be used in a thermal jet printer, it contains a propellant, which is typically a low boiling liquid such as a low molecular weight alcohol or water and is typically the carrier for the coloring agent. Low boiling solvents which are not carriers for the coloring agent can also be used as propellants. The amount of propellant can range from 10 to 95 vol. % of the total ink formulation. Preferably, the propellant comprises about 75 vol. % of the total ink formulation. Where the ink composition is to be used in a "continuous" ink jet process, a propellant is not needed. The droplets are formed by a vibrating crystal and deflected by an electric field. The ink composition preferably has a resistivity of less than 10,000 ohms/cm to achieve deflection.

The above components can be mixed and dispersed uniformly at ambient temperature by conventional means such as a simple impeller within a vessel or a roll mill to obtain the ink composition of the present invention. Most mixtures can be heated, if desired, to aid the dispersion of the components. It is often desirable to filter the mixture to remove large solids or occlusions which may clog the ink jet.

The jet inks of the present invention adhere well to various substrates such as coated and uncoated paper, wood and plastics and show no removal or peeling off from the surface caused by stress or strain with the deformation of the substrate.

The jet inks of the present invention can be used in conventional drop-on-demand ink jet printers if the viscosity and maximum particle size is adjusted. Preferably the jet inks of this invention are used in printers consistent with the configurations disclosed in U.S. Pat. Nos. 5,777,644; 5,510,817 and 5,576,747 and JP A 02-74386 for inks with electro-rheological fluids. The electrodes need only be reconfigured to provide a magnetic field to the ink instead of an electric field.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. All publications and patents cited above and below are hereby incorporated by reference.

In the foregoing and in the following examples, all temperatures are set forth in degrees Celsius and unless otherwise indicated, all parts and percentages are by weight.

EXAMPLE

Example 1

Ink Formulation

An ink formulation of the present invention is prepared by combining 20 ml of a black jet ink which comprises a carbon black pigment in a liquid carrier based on water, available from Renewable Resources Inc. Staten Island, N.Y. under the trade name REINK, and 5 ml of a magneto-rheological modifier comprising a carbonyl iron powder and water in a volume ratio of 25:75. The viscosity of the black jet ink formulation is adjusted to 2.5 cps at 25° C. with the addition of more water and filtered. The ink is employed in a conventional Bubble jet printer.

The preceding example can be repeated with similar success by substituting the generically or specifically described components and/or operating conditions of this invention for those used in the preceding example. From the foregoing description, one skilled in the art can easily ascertain the essential characteristics of this invention, and without departing from the spirit and scope thereof, can make various changes and modifications of the invention to adapt it to various usages and conditions.

What is claimed is:

1. An ink composition suitable for use in ink jet printing which comprises:

a) one or more coloring agents selected from organic and inorganic pigments and dyes, b) a carrier for said coloring agent selected from water, plasticizer alcohols and glycols, and c) at least one magneto-rheological fluid of a size greater than 0.1 $\mu$m and a carrier which is soluble or emulsifiable in the carrier for said coloring agent, wherein said ink composition has a viscosity of from 1–100 cps at 25° C. in the absence of an external magnetic field, a higher viscosity when an external magnetic field is applied thereto and comprises sufficient magneto-rheological fluid to render the ink essentially solid at 25° C. when an external magnetic field is applied thereto.

2. An ink composition suitable for use in ink jet printing which comprises:
   a) one or more coloring agents selected from organic and inorganic pigments and dyes;
   b) a carrier for said coloring agent selected from the group consisting of water, plasticizers, alcohols and glycols; and
   c) at least one magneto-rheological fluid comprising magnetically active particles of a size greater than 1 $\mu$m and a carrier which is soluble or emulsifiable in the carrier for said coloring agent, wherein said ink composition has viscosity of less than 5 cps at 25° C. in the absence of an external magnetic field and a higher viscosity when an external magnetic field is applied thereto.

3. An ink composition suitable for use in ink jet printing which comprises:
   a) one or more coloring agents selected from organic and inorganic pigments and dyes;
   b) a carrier for said coloring agent selected from the group consisting of water, plasticizers, alcohols and glycols; and
   c) 0.1 to 20 vol. % of at least one magneto-rheological fluid comprising magnetically active particles of a size in the range of 1 to 5 $\mu$m and a carrier selected from water, alcohols, glycols and mixtures thereof which is soluble or emulsifiable in the carrier for said coloring agent, wherein said ink composition has a viscosity of less than 5 cps at 25° C. in the absence of an external magnetic field and higher viscosity when an external magnetic field is applied thereto.

4. An ink composition suitable for use in ink jet printing which comprises:
   a) one or more coloring agents selected from organic and inorganic pigments and dyes,
   b) a carrier for said coloring agent, and
   c) at least one magneto-rheological fluid comprising magnetically active particles of a size greater than 0.1 $\mu$m and a carrier which is soluble or emulsifiable in the carrier for said coloring agent,
wherein said ink composition has a viscosity of from 1–100 cps at 25° C. in the absence of an external magnetic field and a higher viscosity when an external magnetic field is applied thereto and
the amount of magneto-rheological fluid provides an amount of magnetically active particles in the range of 1 to 10 wt % based on the total weight of the ink.

5. An ink composition as in claim 4, wherein the magneto-rheological fluid comprises a magnetically active particle selected from iron, carbonyl iron, powdered magnetite and iron alloys;
   and a water-based carrier fluid.

6. An ink composition as in claim 2 which comprises sufficient magneto-rheological fluid to render the ink essentially solid at 25° C. when a magnetic field is applied thereto.

7. In an ink composition as in claim 3 which comprises sufficient rheological fluid to vendor the ink essentially solid at 25° C. when a magnetic field is applied thereto.

8. An ink composition as in claim 4 which additionally contains a low boiling solvent other than the carrier for the coloring agent as a propellant.

9. An ink composition suitable for use in ink jet printing which comprises:
   a) one or more coloring agents selected from organic and inorganic pigments and dyes,
   b) a carrier for said coloring agent, and
   c) at least one magneto-rheological fluid comprising magnetically active particles of a size in the range of 1 to 5 $\mu$m and a carrier which is soluble or emulsifiable in the carrier for said coloring agent,
wherein said ink composition has a viscosity of from 1–100 cps at 25° C. in the absence of an external magnetic field and a higher viscosity when an external magnetic field is applied thereto.

10. An ink composition as in claim 2, wherein the magnetically active particles are of a size in the range of 1 to 5 $\mu$m.

11. An ink composition as in claim 4 which additionally contains a polymeric binder which is soluble or dispersible in the carrier for the coloring agent.

12. An ink composition as in claim 2, wherein the amount of magneto-rheological fluid provides an amount of magnetically active particles in the range of 1 to 10 wt. % based on the total weight of the ink.

13. An ink composition as in claim 3, wherein the amount of magneto-rheological fluid provides an amount of magnetically active particles in the range of 1 to 10 wt. % based on the total weight of the ink.

14. An ink composition as in claim 2, wherein the magneto-rheological fluid comprises a magnetically active particle selected from iron, carbonyl iron, powdered magnetite and iron alloys;
   and a water-based carrier fluid.

15. An ink composition as in claim 3, wherein the magneto-rheological fluid comprises a magnetically active particle selected from iron, carbonyl iron, powdered magnetite and iron alloys;
   and a water-based carrier fluid.

16. In an ink composition as in claim 2 which additionally contains a low boiling solvent other than the carrier for the coloring agent as a propellant.

17. In an ink composition as in claim 3 which additionally contains a low boiling solvent other than the carrier for the coloring agent as a propellant.

18. An ink composition as in claim 2 which additionally contains a polymeric binder which is soluble or dispersible in the carrier for the coloring agent.

19. An ink composition as in claim 3 which additionally contains a polymeric binder which is soluble or dispersible in the carrier for the coloring agent.

* * * * *

UNITED STATES PATENT AND TRADEMARK OFFICE
CERTIFICATE OF CORRECTION

PATENT NO. : 6,221,138 B1  
DATED : April 24, 2001  
INVENTOR(S) : Frank J. Kenny Page 1 of 1

It is certified that error appears in the above-identified patent and that said Letters Patent is hereby corrected as shown below:

<u>Column 10,</u>  
Line 2, delete "vendor" and insert -- render -- therefor.

Signed and Sealed this

Twenty-sixth Day of March, 2002

Attest:

Attesting Officer

JAMES E. ROGAN  
*Director of the United States Patent and Trademark Office*